(12) United States Patent
Yoon

(10) Patent No.: US 9,190,102 B2
(45) Date of Patent: Nov. 17, 2015

(54) DISC CLAMP WITH BALANCERS PROVIDING IMPROVED DURABILITY AND BALANCE AND SPINDLE MOTOR HAVING THE SAME

(71) Applicant: LG INNOTEK CO., LTD., Seoul (KR)

(72) Inventor: Hoeop Yoon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/029,475

(22) Filed: Sep. 17, 2013

(65) Prior Publication Data

US 2014/0020000 A1 Jan. 16, 2014

Related U.S. Application Data

(63) Continuation of application No. 12/980,827, filed on Dec. 29, 2010, now Pat. No. 8,566,852.

(30) Foreign Application Priority Data

Dec. 29, 2009 (KR) .................... 10-2009-0132663

(51) Int. Cl.
G11B 19/20 (2006.01)
G11B 17/028 (2006.01)
G11B 17/03 (2006.01)
G11B 17/04 (2006.01)
G11B 33/02 (2006.01)

(52) U.S. Cl.
CPC ........ G11B 17/0284 (2013.01); G11B 17/0282 (2013.01)

(58) Field of Classification Search
CPC .................... G11B 17/0284; G11B 17/0282
USPC ........ 720/604, 695–698, 703, 704, 706, 707, 720/712, 721–724
See application file for complete search history.

(56) References Cited

U.S. PATENT DOCUMENTS

2008/0046906 A1 2/2008 Takaki et al.

FOREIGN PATENT DOCUMENTS

CN 101507087 A 8/2009

OTHER PUBLICATIONS

Office Action dated Feb. 17, 2015 in Chinese Application No. 201010611456.3.

*Primary Examiner* — Gustavo Polo
(74) *Attorney, Agent, or Firm* — Saliwanchik, Lloyd & Eisenschenk

(57) ABSTRACT

A disc clamp and a spindle motor having the same is provided, the disc clamp according to an exemplary embodiment comprising: a disc clamp body; a first disc balancer projected from the disc clamp body in the horizontal direction and configured to have a first thickness; and a second disc balancer bent downwards from an end of the first disc balancer to fix the disc and configured to have a second thickness, wherein an angle between a horizontal surface of the first disc balancer and the second disc balancer is in the range of 92° to 95°.

4 Claims, 2 Drawing Sheets

DISC CLAMP WITH BALANCERS PROVIDING IMPROVED DURABILITY AND BALANCE AND SPINDLE MOTOR HAVING THE SAME

CROSS-REFERENCE TO RELATED APPLICATIONS

This application is a continuation of U.S. application Ser. No. 12/980,827, filed Dec. 29, 2010, which claims the benefit under 35 U.S.C. §119 of Korean Patent Application No. 10-2009-0132663, filed Dec. 29, 2009, which are hereby incorporated by reference in their entirety.

BACKGROUND

1. Field of the Invention

The present disclosure relates to a disc clamp and a spindle motor having the same.

2. Description of the Related Art

Generally, a spindle motor is widely used to rotate a disc at an ultra high speed in an optical disc drive (ODD) and a hard disc drive.

The spindle motor includes a stator having a core wound with a coil, a rotational axis that rotates with respect to the stator, a yoke arranged at the rotational axis and a rotor having a magnet arranged at the yoke. Further, the rotational axis has a disc clamp fixed thereto, the clamp inhibiting the disc from being detached from the rotational axis that rotates at a high speed. The disc clamp includes a balancer that makes a rotational center of the disc identical to that of a rotational axis.

A balancer of a general spindle motor is manufactured of a thin plastic material having elasticity in order that the disc is not inserted into the balancer and not extracted from it with ease.

However, a balancer of the spindle known in the art has a problem that the balancer is broken or damaged as the disc is repeatedly inserted into and extracted from it.

BRIEF SUMMARY

Exemplary aspects of the present disclosure are to substantially solve at least the above problems and/or disadvantages and to provide at least the advantages as mentioned below. Thus, the present invention is to provide a disc clamp into which a disc is not inserted with ease and from which the disc is not extracted with ease and which is neither broken nor damaged with ease even though the disc is repeatedly inserted into and extracted from the disc clamp, and a spindle motor having the same.

In one aspect of the present disclosure, there may be provided, a disc clamp, comprising: a disc clamp body; a first disc balancer projected from the disc clamp body in the horizontal direction and configured to have a first thickness; and a second disc balancer bent downwards from an end of the first disc balancer to fix the disc and configured to have a second thickness, wherein an angle between a horizontal surface of the first disc balancer and the second disc balancer is in the range of 92° to 95°.

In some exemplary of the present invention, a balance ratio by the angles of the first and second disc balancers may be in the range of 60 μm to 70 μm, and an insertion force of the disc is in the range of 200 [gf] to 300 [gf].

In some exemplary of the present invention, an edge portion where the horizontal surface of the first disc balancer meets an outer surface of the second disc balancer may be formed as a curved surface. In some exemplary of the present invention, a ratio of the first thickness to the second thickness may be in the range of 1.5 to 1.8.

In other general aspect of the present disclosure, there may be provided a disc clamp, comprising: a disc clamp body; a first disc balancer projected from the disc clamp body in the horizontal direction and configured to have a first thickness; and a second disc balancer bent downwards from an end of the first disc balancer to fix the disc and configured to have a second thickness, wherein a ratio of the first thickness to the second thickness is in the range of 1.5 to 1.8.

In another general aspect of the present disclosure, there may be provided a spindle motor, comprising: a stator configured to include a bearing housing engaged with a base plate, a bearing inserted into the bearing housing, a core engaged with an outer circumference surface of the bearing housing, and a coil wound around the core; a rotational axis rotatably engaged with the bearing; a rotor configured to include a yoke engaged with the rotational axis, and a magnet fixed inside the yoke and facing the core; and a disc clamp including: a disc clamp body; a first disc balancer projected from the disc clamp body in the horizontal direction and configured to have a first thickness; and a second disc balancer bent downwards from an end of the first disc balancer to fix the disc and configured to have a second thickness, wherein an angle between a horizontal surface of the first disc balancer and the second disc balancer is in the range of 92° to 95°.

In some exemplary of the present invention, a balance ratio by the angles of the first and second disc balancers may be in the range of 60 μm to 70 μm, and an insertion force of the disc is in the range of 200 [gf] to 300 [gf].

In some exemplary of the present invention, an edge portion where the horizontal surface of the first disc balancer meets an upper surface of the second disc balancer may be formed as a curved surface.

In some exemplary of the present invention, a thickness ratio of the first thickness to the second thickness may be in the range of 1.5 to 1.8.

The present disclosure has an advantageous effect in that the required disc insertion force, balance performance and enhanced durability can be embodied by changing the thickness ratio of the first and second balance portions of the disc clamp engaged with the rotational axis that rotates at a high speed.

DETAILED DESCRIPTION

Advantages and features of the present disclosure may be understood more readily by reference to the following detailed description of exemplary embodiments and the accompanying drawings. Thus, the present disclosure is not limited to the exemplary embodiments which will be described below, but may be implemented in other forms. Accordingly, the described aspect is intended to embrace all such alterations, modifications, and variations that fall within the scope and novel idea of the present disclosure.

Now, exemplary embodiments of the present disclosure will be described in detail with reference to the accompanying drawings.

Figure 1:
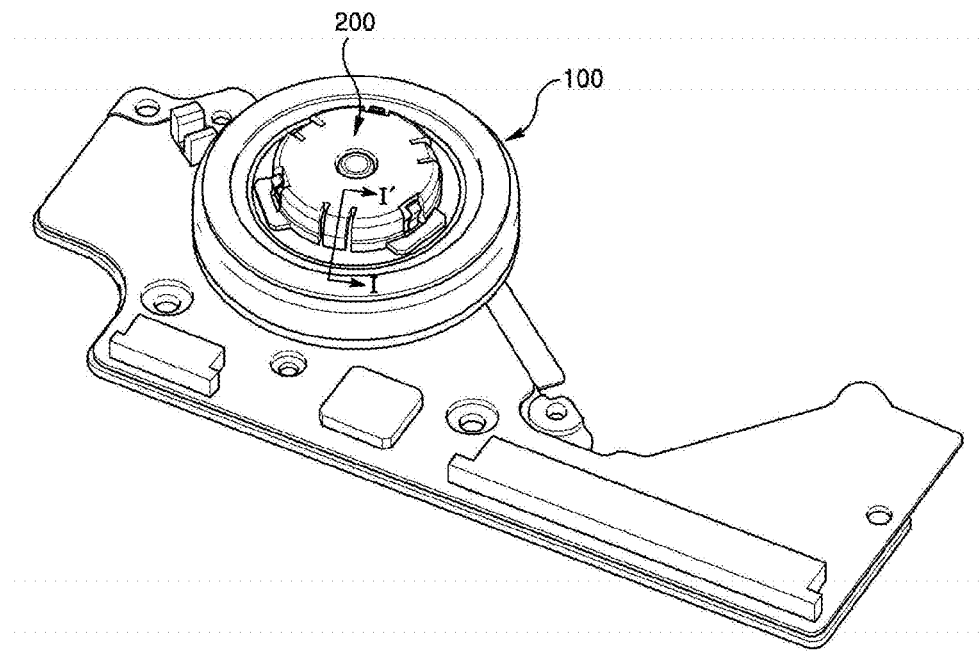
FIG. 1 is a perspective view showing a disc clamp of a spindle motor according to an embodiment of the present disclosure.
Figure 2:
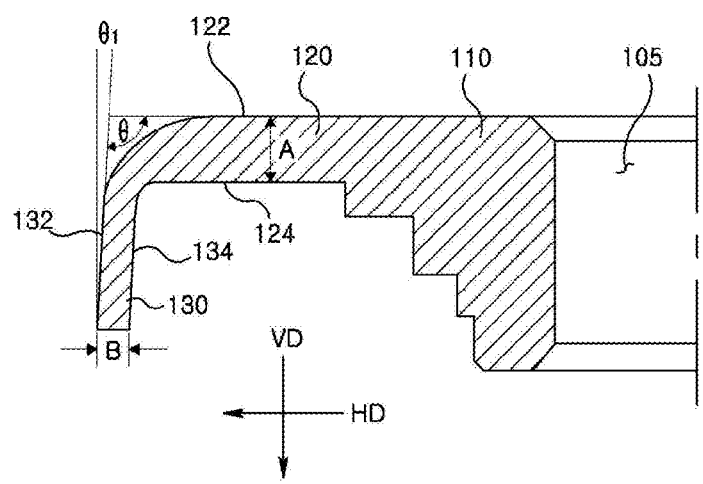
FIG. 2 is a sectional view cut along I-I' line in FIG. 1.

FIG. 1 is a perspective view showing a disc clamp of a spindle motor according to an embodiment of the present disclosure; and FIG. 2 is a sectional view cut along I-I' line in FIG. 1.

Referring to FIGS. 1 and 2, a disc clamp 100 of a spindle motor 200 includes a disc clamp body 110 having a rotational axis hole 105, a first disc balancer 120 and a second disc balancer 130.

In an embodiment of the present disclosure, an exemplary material for the disc clamp body 110, the first disc balancer 120 and the second disc balancer 130 may be a synthetic resin such as plastic or metal.

The first disc balancer 120 is projected or extended from the side of the disc clamp body 110 in the horizontal direction HD defined in FIG. 2.

In an embodiment of the present disclosure, the first disc balancer 120 is formed in a plate shape which has a uniform thickness A. The first disc balancer 120 has an upper surface (or a horizontal surface 122) and a bottom surface 124 facing the upper surface 122.

The second disc balancer 130 is formed in a plate shape which has a uniform thickness B and is bent or extended from the end of the first disc balancer 120 in the vertical direction VD defined in FIG. 2. The second disc balancer 130 formed in a plate shape has an outer side surface 132 and an inner side surface 134 facing the outer side surface 132.

An edge where the upper surface 122 of the first disc balancer 120 meets the outer side surface 132 of the second disc balancer 130 is rounded in order that a hole (not shown) of a disc (not shown) which is a data storage medium is easily inserted into the edge. Differently from this, a chamfer portion cut obliquely may be formed at an edge where the upper surface 122 of the first disc balancer 120 meets the outer side surface 132 of the second disc balancer 130.

In order that the hole of the disc that is data storage medium is inserted into the second disc balancer 130 of the disc clamp 100 with a required insertion force, the second disc balancer 130 is bent with respect to the first disc balancer 120 in the optimum angle range.

A bent angle θ formed between the upper surface 122 of the first disc balancer 120 and the outer side surface 132 of the second disc balancer 130 may be from 92.0° to 95.0°, for example. When describing it in a different way, the second disc balancer 130 has an inclined angle θ1 inclined at about 2.0° to 5.0° clockwise with respect to the vertical direction VD. Table 1 includes disc insertion force and disc balance performance data according to a gradient change of the second disc balancer 130 with respect to a vertical direction in an embodiment of the present disclosure.

TABLE 1

| Inclined angle (θ1) | Insertion force (gf) | Balance performance (μm) |
| --- | --- | --- |
| 1.9° | 320 gf | 60 μm |
| 2.0° | 300 gf | 60 μm |
| 3.0° | 260 gf | 60 μm |
| 4.0° | 220 gf | 60 μm |
| 5.0° | 200 gf | 70 μm |
| 5.1° | 180 gf | 70 μm |

In an embodiment of the present disclosure, the insertion force required to insert the hole of the disc into the second disc balancer 130 is generally from about 200 [gf] to about 300 [gf] and the required balance performance is from about 60 μm to about 70 μm. Referring to the Table 1, when the inclined angle θ1 shown in FIG. 1 is about 1.9°, the balance performance is excellent as 60 μm but the insertion force is about 320 gf which is out of the insertion force range required for a user to insert the disc into the second disc balancer 130.

When the inclined angle θ1 is from about 2.0° to about 5.0°, the balance performance is excellent as about 60 μm to about 70 μm, and the insertion force is about 200 gf to about 300 gf, which is included in the required insertion force, too.

Meanwhile, when the inclined angle θ1 is equal to or greater than about 5.1° which exceeds about 5.0°, the balance performance is about 75 μm which is out of the maximum value of the balance performance, about 70 μm, and the insertion force is about 180 gf which is out of the required insertion force.

According to the Table 1, when the inclined angle θ1 is less than about 2.0°, the insertion force largely increases so that it is difficult for the user to insert the disc into the second disc balancer 130 with ease. Further, when the inclined angle θ1 exceeds about 5.0°, the insertion force is largely decreased and out of the maximum balance performance range.

Accordingly, when the inclined angle θ1 is about 2.0° to about 5.0°, the disc insertion force and the maximum balance performance of the disc clamp 100 are included in the range set previously.

Meanwhile, according to an embodiment of the present disclosure, a consideration should be made to the thicknesses of the first disc balancer 120 and the second disc balancer 130 to enhance durability of the first disc balancer 120 as well as the inclined angle θ1 to provide the insertion force required to insert the hole of the disc into the second disc balancer 130.

In order to reduce a fatigue fracture of the first disc balancer 120 occurred by a repetitive bending stress that is applied to the first disc balancer 120 during the hole of the disc that is data storage medium is inserted into or extracted from the disc clamp 100 that has the disc clamp body 110, the first disc balancer 120 and the second disc balancer 130, the first disc balancer 120 is formed to have a first thickness A and the second disc balancer 130 is formed to have a second thickness B.

According to an embodiment of the present disclosure, a ratio of the first thickness A of the first disc balancer 120 to the second thickness B of the second disc balancer 130, A/B, may be about 1.5 to about 1.8.

Table 2 includes a normal insertion and extraction number and balance performance data according to a thickness ratio of a first thickness A of the first disc balancer 120 to the second thickness B of the second disc balancer 130, A/B, in accordance with an embodiment of the present disclosure.

TABLE 2

| Thickness ratio (A/B) | Normal insertion and extraction number | Balance performance (μm) |
| --- | --- | --- |
| 1.4 | About 8,000 times | 60 μm |
| 1.5 | 10,000 times or more | 60 μm |
| 1.6 | 10,000 times or more | 60 μm |
| 1.7 | 10,000 times or more | 60 μm |
| 1.8 | 10,000 times or more | 69 μm |
| 1.9 | 10,000 times or more | 74 μm |

In an embodiment of the present disclosure, the second disc balancer 130 should insert and extract the disc about 8,000 times to about 10,000 times.

Referring to Table 2, when a thickness ratio of a first thickness A of the first disc balancer 120 to a second thickness B of the second disc balancer 130, A/B, is about 1.4, the balance performance is excellent as about 60 μm but the normal insertion and extraction number is about 8,000 times, which is out of a required durability range. That is, when the thickness ratio A/B is about 1.4, the durability is largely decreased so that the first disc balancer 120 is broken or damaged after inserting and extracting it about 8,000 times.

When the thickness ratio of the first thickness A of the first disc balancer 120 to the second thickness B of the second disc balancer 130, A/B, is about 1.5 to about 1.8, all the balance performances are excellent as about 60 μm, and the normal insertion and extraction number is 10,000 times or more, which shows that the durability is largely enhanced compared with the case that the thickness ratio A/B is about 1.4.

Meanwhile, when the thickness ratio of the first thickness A of the first disc balancer 120 to the second thickness B of the second disc balancer 130 is about 1.9, the normal insertion and extraction number is 10,000 times or more, too, which shows that the durability is largely enhanced compared with the case that the thickness ration A/B is about 1.4, but the balance performance is about 74 μm, which is out of the maximum balance performance.

According to the Table 2, when the thickness ratio A/B is less than about 1.4, it does not meet the required durability. Further, when the thickness ratio A/B exceeds about 1.9, it satisfies the required durability but the balance performance is decreased.

Accordingly, when the thickness ratio A/B is about 1.5 to 1.8, the first disc balancer 120 can satisfy the required durability and balance performance.

Figure 3:
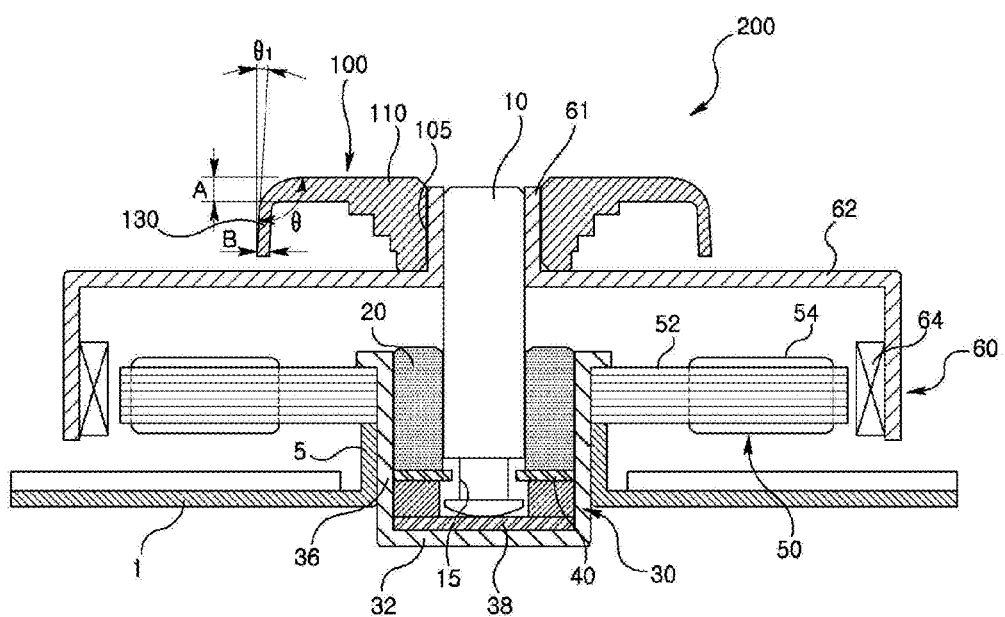
FIG. 3 is a sectional view showing a spindle motor according to another embodiment of the present disclosure.

FIG. 3 is a sectional view showing a spindle motor according to another embodiment of the present disclosure.

Referring to FIG. 3, the spindle motor 200 includes a base plate 1, a rotational axis 10, a stator 50, a rotor 60 and a disc clamp 100.

The base plate 1 is formed in a plate shape, on which a burring portion 5 is formed, the burring portion being formed by a burring process. The burring portion 5 is formed inwards from the outer side surface of the base plate 1, for example, to which a bearing housing 30 to be described below is engaged.

The rotational axis 10 is engaged with a rotor 60 to be described below, and there is formed an axial groove 15 in the bottom of the outer circumference surface of the rotational axis 10. The bottom end of the rotational axis 10 is processed as a curved surface, for example.

The stator 50 includes a bearing 20, a bearing housing 30, a core 52 and a coil 54. The stator 50 may further include a washer 40. The bearing 20 is formed in a cylindrical shape having a hollow that is inserted into the rotational axis 10. Further, it may be an oil impregnated sintering bearing, for example.

The washer 40 has a hollow inserted into a portion corresponding to an axial groove 15 of the rotational axis 10, and the hollow of the washer 40 has a diameter that is smaller than that of the rotational axis 10 and greater than that of the rotational axis 10 corresponds to the axial groove 15. Accordingly, the washer 40 is touched to the axial groove 15 so that it limits the movement of the rotational axis 10 up and down. The upper surface of the washer is pressed by the bottom of the bearing 20.

The bearing housing 30 includes a bottom panel 32 and a side panel 36.

The bottom panel 32 is formed in a disc shape, for example, and supports the end portion of the rotational axis 10. A thrust bearing 38 may be arranged between the bottom of the rotational axis 10 and the bottom panel 10 facing the bottom of the rotational axis 10.

The side panel 36 is extended from the bottom panel 32 in the direction facing the rotational axis 10. In an embodiment of the present disclosure, the side panel 36 is extended in a cylindrical shape along the direction parallel to the rotational axis 10.

The core 52 has a structure of a plurality of stacked pieces of iron, and is engaged by being inserted into the side panel 36 of the bearing housing 30.

The coil 54 is wound around the core 52 using a winding portion (not shown) formed in the core 52.

The rotor 60 includes a yoke 62 and a magnet 64.

The yoke 62 is formed in a disc shape, and there is formed a yoke burring portion 61 inserted into the rotational axis 10 at the rotational center. Further, some of the yoke 62 is bent to face the core 52 of the stator 50.

The magnet 64 is engaged with the bent portion of the yoke 62, and the magnet 64 is arranged to face the core 52 of the stator 50.

The disc clamp 100 is engaged with the outer circumference surface or the yoke burring portion 61 of the rotational axis 10, the disc clamp being shown in FIG. 2 and described above.

The disc clamp 100 includes the disc clamp body 110, the first disc balancer 120 and the second disc balancer 130.

The disc clamp body 110 includes a rotational axis hole 105 engaged with the yoke burring portion 61.

The first disc balancer 120 is projected or extended from the disc clamp body 110 in the horizontal direction.

The second disc balancer 130 is bent towards the yoke 60 from the first disc balancer 120.

According to an embodiment of the present disclosure, when the first disc balancer 120 has a first thickness A and the second disc balancer 130 has a second thickness B, the thickness ratio of the first disc balancer 120 to the second thickness B of the disc balancer 130, A/B, may be about 1.5 to about 1.8.

Further, an inclined angle θ1 of the second disc balancer 130 arranged obliquely clockwise with respect to the vertical direction, may be about 2.0° to about 5.0°, for example.

In an embodiment of the present disclosure, when the inclined angle is about 2.0° to about 5.0°, the required insertion force of the disc is about 200 [gf] to 300 [gf] and the required balance performance is from 60 μm to 70 μm.

Further, in an embodiment of the present disclosure, when the thickness ratio A/B is about 1.5 to about 1.8, the first disc balancer 120 can insert and extract disc about 8,000 times to 10,000 times or more so that the required durability can be embodied and the required balance performance can also embodied.

According to the detailed description above, the required disc insertion force, balance performance and enhanced durability can be embodied by changing the thickness ratio of the first and second balance portions of the disc clamp engaged with the rotational axis that rotates at a high speed.

Hereinbefore, while the embodiments of the present disclosure are described, they are exemplary ones only and one of ordinary skill in the art may recognize that various alterations and modifications that fall within the scope of the present disclosure may be possible. Accordingly, the true technical protection scope of the present disclosure should be defined by the following claims.

What is claimed is:
1. A disc clamp, comprising:
a disc clamp body;
a first disc balancer formed in a plate shape having an upper surface and a bottom surface, wherein the first disc bal- ancer is extended from a side of the disc clamp body in a horizontal direction and configured to have a first uniform thickness; and a second disc balancer formed in a plate shape having an inner side surface and an outer side surface, wherein the second disc balancer is straightly and downwardly extended from an edge portion of the first disc balancer and configured to have a second uniform thickness, wherein the edge portion formed between the upper surface of the first disc balancer and the outer side surface of the second disc balancer along an entire periphery of the disc clamp body has a curved surface, wherein the second disc balancer has an angle $\theta 1$ arranged obliquely in a range of 2.0° to 5.0° clockwise with respect to a vertical direction, wherein an angle ($\theta$) between the upper surface of the first disc balancer and the outer side surface of the second disc balancer is in a range of 92° to 95°, and wherein a ratio of the first thickness to the second thickness is in a range of 1.5 to 1.8.

2. The disc clamp according to claim 1, wherein a balance ratio formed by the angle ($\theta$) of the first and second disc balancers is from 60 μm to 70 μm, and an insertion force of the disc clamp is from 200 [gf] to 300 [gf].

3. A spindle motor, comprising:

a stator configured to include a bearing housing engaged with a base plate, a bearing inserted into the bearing housing, a core engaged with an outer circumferential surface of the bearing housing, and a coil wound around the core;

a rotational axis rotatabiy engaged with the bearing;

a rotor configured to include a yoke engaged with the rotational axis, and a magnet fixed inside the yoke and facing the core; and a disc clamp including;

a disc clamp body;

a first disc balancer formed in a plate shape having an upper surface and a bottom surface, wherein the first disc balancer is extended from a side of the disc clamp body in a horizontal direction and configured to have a first uniform thickness; and a second disc balancer formed in a plate shape having an inner side surface and an outer side surface, wherein the second disc balancer is straightly and downwardly extended from an edge portion of the first disc balancer and configured to have a second uniform thickness, wherein the edge portion formed between the upper surface of the first disc balancer and the outer side surface of the second disc balancer along an entire periphery of the disc clamp body has a curved surface, wherein the second disc balancer has an angle $\theta 1$ arranged obliquely in a range of 2.0° to 5.0° clockwise with respect to a vertical direction, wherein an angle ($\theta$) between the upper surface of the first disc balancer and the outer side surface the second disc balancer is in a range of 92° to 95°, and wherein a ratio of the first thickness to the second thickness is in a range of 1.5 to 1.8.

4. The disc clamp according to claim 3, wherein a balance ratio made by the angle ($\theta$) of the first and second disc balancers is from 60 μm to 70 μm, and an insertion force of the disc clamp is from 200 [gf] to 300 [gf].

* * * * *